US 8,565,822 B2

(12) United States Patent
Kim

(10) Patent No.: US 8,565,822 B2
(45) Date of Patent: Oct. 22, 2013

(54) DATA COMMUNICATION SETTING CONTROL METHOD BASED ON SUBSCRIBER IDENTIFICATION MODULE AND PORTABLE DEVICE FOR SUPPORTING THE SAME

(75) Inventor: Jin Yup Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 85 days.

(21) Appl. No.: 13/275,836

(22) Filed: Oct. 18, 2011

(65) Prior Publication Data

US 2012/0122441 A1    May 17, 2012

(30) Foreign Application Priority Data

Nov. 15, 2010    (KR) .................. 10-2010-0113528

(51) Int. Cl.
    *H04M 1/00*    (2006.01)
(52) U.S. Cl.
    USPC ........ 455/558; 455/418; 455/435.2; 455/574; 455/552.1; 370/311; 370/231
(58) Field of Classification Search
    USPC ............. 455/558, 418–420, 435.2, 572–574, 455/433, 434, 414.1–414.3; 370/311, 338
    See application file for complete search history.

(56) References Cited

U.S. PATENT DOCUMENTS

| 5,557,679 A * | 9/1996 | Julin et al. .................... 380/249 |
| 6,859,650 B1 * | 2/2005 | Ritter ............................. 455/406 |
| 7,761,097 B2 * | 7/2010 | Chaudry et al. ........... 455/435.2 |
| 7,969,924 B2 * | 6/2011 | Young et al. .................. 370/311 |
| 8,145,213 B2 * | 3/2012 | Park ............................. 455/434 |
| 8,208,950 B2 * | 6/2012 | Islam et al. ................... 455/458 |
| 8,457,621 B2 * | 6/2013 | Mardiks ....................... 455/419 |
| 2004/0152462 A1 * | 8/2004 | Hwang ....................... 455/432.1 |
| 2009/0061934 A1 * | 3/2009 | Hauck et al. ................. 455/558 |
| 2009/0129339 A1 * | 5/2009 | Young et al. .................. 370/331 |
| 2010/0118752 A1 * | 5/2010 | Suzuki et al. ................. 370/311 |
| 2012/0077495 A1 * | 3/2012 | Kim et al. .................. 455/435.1 |
| 2012/0094722 A1 * | 4/2012 | Kim .............................. 455/566 |
| 2012/0120799 A1 * | 5/2012 | Brisebois et al. ............. 370/231 |
| 2012/0124196 A1 * | 5/2012 | Brisebois et al. ............. 709/224 |

* cited by examiner

*Primary Examiner* — Sharad Rampuria
(74) *Attorney, Agent, or Firm* — Jefferson IP Law, LLP

(57) ABSTRACT

A method and a portable device that support the control of a data communication setting are provided. The portable terminal includes a Subscriber Identification Module (SIM) card interface into which the SIM is inserted. The device further includes a control unit, a memory unit, and a radio frequency unit. The control unit extracts Mobile Country Code/Mobile Network Code (MCC/MNC) information from the inserted SIM, determines data communication setting information corresponding to the MCC/MNC information from a policy table containing the data communication setting information for each MCC/MNC information, and establishes a data communication by using the determined data communication setting information. The memory unit stores the policy table, and the radio frequency unit performs the established data communication with a specific service operator network related to the SIM under the control of the control unit.

13 Claims, 4 Drawing Sheets

DATA COMMUNICATION SETTING CONTROL METHOD BASED ON SUBSCRIBER IDENTIFICATION MODULE AND PORTABLE DEVICE FOR SUPPORTING THE SAME

PRIORITY

This application claims the benefit under 35 U.S.C. §119 (a) of a Korean patent application filed on Nov. 15, 2010 in the Korean Intellectual Property Office and assigned Serial No. 10-2010-0113528, the entire disclosure of which is hereby incorporated by reference.

BACKGROUND OF THE INVENTION

1. Field of the Invention

The present invention relates to a portable device. More particularly, the present invention relates to a data communication setting control method and portable device based on a Subscriber Identification Module (SIM) which may allow an update of data communication setting and also allow an update of fast dormancy information according to SIM types.

2. Description of the Related Art

Recently, portable devices are becoming increasingly popular based on their mobility and the various additional and useful functions that they now provide. A mobile communication device, such as a Personal Digital Assistant (PDA), etc., are representatives of such a portable device. A mobile communication device is equipped with a module for supporting a mobile communication function and supports voice and data communications with other mobile communication devices through a base station. A PDA has a Central Processing Unit (CPU), a memory, an Operating System (OS), various programs based on the OS, and various other components, and may perform information gathering, storing, creating and searching. With these capabilities, a conventional portable device supports a mobile communication function or supports a specific user function based on various programs stored in the memory. Additionally, a conventional portable device supports the operation based on a SIM.

Such a portable device accesses a network, provided by a specific service operator, depending on data communication setting information stored in the SIM, and sends or receives information required for data communication. The portable device may access a network of another service operator for any of various reasons such as roaming. In this case, data communication setting information offered by a current service operator may often be different from that offered by the former service operator. This may cause a problem in that the portable device fails to perform a proper data communication. Furthermore, inconsistency in data communication setting information between service operators may give rise to various restrictions in a data communication, so that a conventional portable device may have difficulty in providing seamless communication services.

SUMMARY OF THE INVENTION

Aspects of the present invention are to address at least the above-mentioned problems and/or disadvantages and to provide at least the advantages described below. According, an aspect of the present invention is to provide an apparatus and method for realizing a proper data communication of a portable device by allowing an update of a data communication setting according to each Subscriber Identification Module (SIM).

Another aspect of the present invention is to reduce power consumption of a portable device by applying fast dormancy during an update of data a communication setting.

According to an aspect of the present invention, a data communication setting control method based on a SIM inserted into a portable device is provided. The method includes extracting Mobile Country Code/Mobile Network Code (MCC/MNC) information from the inserted SIM, determining data communication setting information corresponding to the MCC/MNC information from a policy table containing the data communication setting information for each MCC/MNC information stored in a memory unit, and establishing a data communication with a specific service operator network for a camping-on, based on both the determined data communication setting information and the SIM.

According to another aspect of the present invention, a portable device for supporting a data communication setting control based on a SIM is provided. The device includes a SIM card interface into which the SIM is inserted, a control unit for extracting MCC/MNC information from the inserted SIM, for determining data communication setting information corresponding to the MCC/MNC information from a policy table containing the data communication setting information for each MCC/MNC information, and for establishing a data communication using the determined data communication setting information, a memory unit for storing the policy table, and a Radio Frequency (RF) unit for performing the established data communication with a specific service operator network related to the SIM under the control of the control unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to their bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
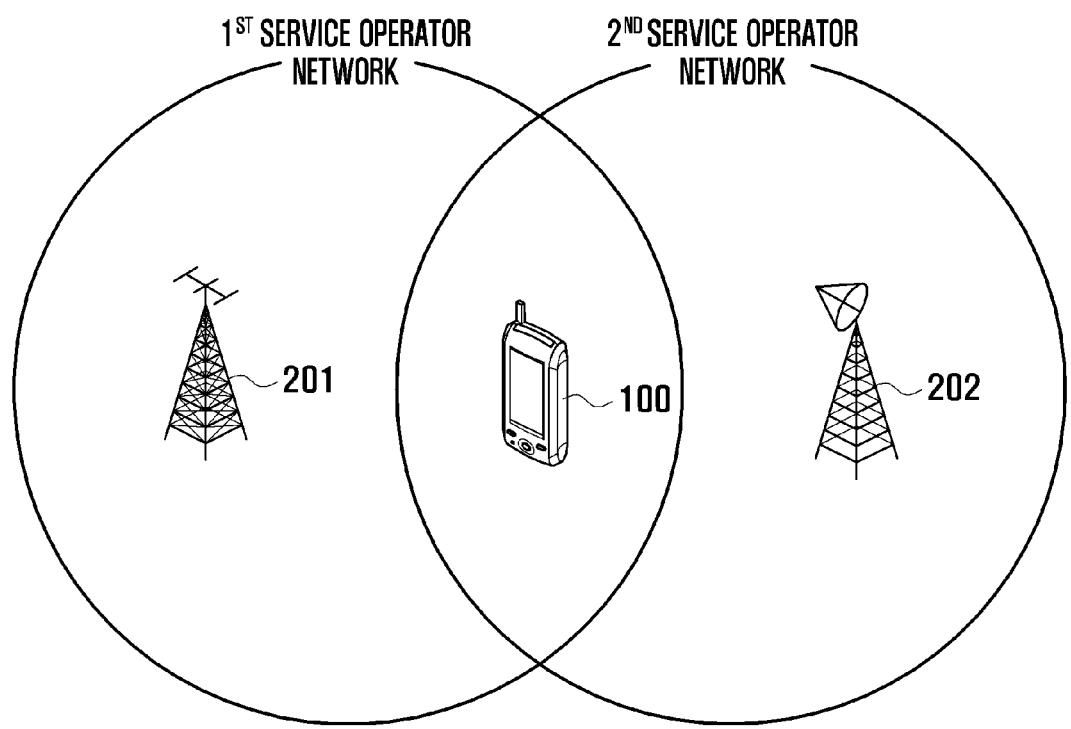
FIG. 1 is a schematic view illustrating the configuration of a network system for a Subscriber Identification Module (SIM)-based data communication setting control in accordance with an exemplary embodiment of the present invention.

FIG. 1 is a schematic view illustrating the configuration of a network system for a Subscriber Identification Module (SIM)-based data communication setting control in accordance with an exemplary embodiment of the present invention.

Referring to FIG. 1, the network system in this invention may include a first service operator network 201, a second service operator network 202, and a portable device 100. Although only two service operator networks are shown in FIG. 1, this is exemplary and not to be considered as a limitation of the present invention. That is, various and additional service operator networks may be included in the network system.

In the above network system, it is assumed that the portable device 100 operates on the basis of a first SIM in the first service operator network 201, moves to a communication range of the second service operator network 202, and uses a second SIM. Here, depending on the distribution of service operator networks, the portable device 100 may perform a camping-on to a new service operator network through only the change of SIMs. If the portable device 100 changes SIMs in an overlap area between communication ranges of the first and second service operator networks 201 and 202 as illustrated, the portable device 100 may perform a camping-on to a user's desired service operator network. In this process, the portable device 100 not only may prevent errors in a data communication procedure by updating data communication setting information on the basis of Mobile Country Code (MCC) and Mobile Network Code (MNC) information stored in a new SIM, but may also more efficiently use electric power by performing a fast dormancy policy at an appropriate time.

When the portable device 100 performs a camping-on, the first service operator network 201 may accept the portable device 100 depending on whether the portable device 100 is a subscriber of a service. Additionally, the first service operator network 201 may grant an identification number required for communication with the portable device 100 in order to support a mobile communication function of the portable device 100, and may also support a communication channel with the portable device 100. Furthermore, the first service operator network 201 may form a communication channel with the portable device 100, depending on SIM-based information received from the portable device 100. The first service operator network 201 may include a plurality of base stations and a base station controller for controlling each individual base station. The portable device 100 may receive the first SIM at the time of a subscription to a mobile communication service through the first service operator network 201, and may also perform a camping-on after a search for base stations of the first service operator network 201 depending on information stored in the first SIM.

The second service operator network 202, different from the first service operator network 201, may accept the portable device 100 depending on whether the portable device 100 is a subscriber of a service when the portable device 100 requests a camping-on. As the first service operator network 201 does, the second service operator network 202 may grant the second SIM use of a service when the portable device 100 requests a subscription to the second service operator network 202. The portable device 100 may be equipped with the second SIM, perform a camping-on to the second service operator network 202 on the basis of subscriber information stored in the second SIM in a booting process, and form a communication channel with the second service operator network 202 in order to perform a communication function at a user's request.

The portable device 100 may become a subscriber of the first service operator that manages the first service operator network 201, and may be equipped with the first SIM received from the first service operator. The first SIM may store information related to various services such as a voice call service, a video call service, and a data communication service. More particularly, the first SIM may store Public Land Mobile Network (PLMN) ID information, namely MCC and MNC, of the first service operator network 201. When the first SIM is inserted and a booting process is performed, the portable device 100 searches for a neighboring base station, namely a base station residing in the first service operator network 201, and performs a camping-on based on the searched base station. Additionally, the portable device 100 reads MCC/MNC information from the first SIM, searches for data communication setting information corresponding to the MCC/MNC information, and performs a data communication according to the searched data communication setting information. Here, the portable device 100 may update data communication setting information according to a fast dormancy policy and perform a resource cancellation according to the updated data communication setting information during a data communication.

The portable device 100 may become a subscriber of the second service operator that manages the second service operator network 202, and may be equipped with the second SIM received from the second service operator. The second SIM may store information related to various services such as a voice call service, a video call service, and a data communication service. More particularly, the second SIM may store PLMN ID information, namely MCC and MNC, of the second service operator network 202. When the second SIM is inserted and a booting process is performed, the portable device 100 searches for a neighboring base station, namely a base station residing in the second service operator network 202, and performs a camping-on based on the searched base station. Additionally, the portable device 100 reads MCC/MNC information from the second SIM, searches for data communication setting information corresponding to the MCC/MNC information, and performs a data communication according to the searched data communication setting information. Furthermore, the portable device 100 may apply a fast dormancy policy according to updated data communication setting information.

The portable device 100 may support an update process by replacing the previous data communication setting information stored in a memory unit with data communication setting information corresponding to MCC/MNC information stored in a new SIM when the first or second SIM is changed. When the same SIM is inserted again, the portable device 100 may apply a fast dormancy policy according to existing data communication setting information without additionally performing an update of data communication setting information.

Fast dormancy information may contain timing information for releasing Radio Resource Control (RRC) to be used when the portable device 100 performs a data communication with the network. Namely, fast dormancy information has particular information that indicates whether the portable device 100 is allowed to perform RRC release in a data communication process and, if allowed, when RRC release is performed. Normally, in case of a service operator network that fails to set fast dormancy, RRC release is performed according to the control of the network. In this case, the network may perform RRC release for a relatively longer time, depending on a data communication maintenance policy or a radio resource recovery policy. A fast dormancy policy may be differently established for each service operator, or an operator may not be supported by such a policy. For this reason, if fast dormancy is not properly established for each individual service operator in the portable device 100, a data communication may not be performed through an appropriate service operator network or, even if successfully performed, a specific restriction may be caused. Additionally, since the portable device 100 may fail to update a data communication setting or fail to recognize the need for an update of the data communication setting even though entering into another service operator network by means of roaming, unnecessary power consumption or unknown restrictions in a data communication may be caused. Therefore, the portable device 100 of this invention may store, in the form of a table, information about the data communication setting supported by a specific service operator network and also update the data communication setting of a current service operator network in response to the change of SIMs, so that a proper data communication may be performed. Additionally, even though a user does not voluntarily set up a fast dormancy, the portable device 100 may determine whether a current service operator network for an automatic camping-on at the time of an insertion of a SIM supports a fast dormancy policy, may support the data communication setting, and thereby may suppress power consumption. An exemplary configuration of a portable device will be described in more detail below with reference to the drawings.

Figure 2:
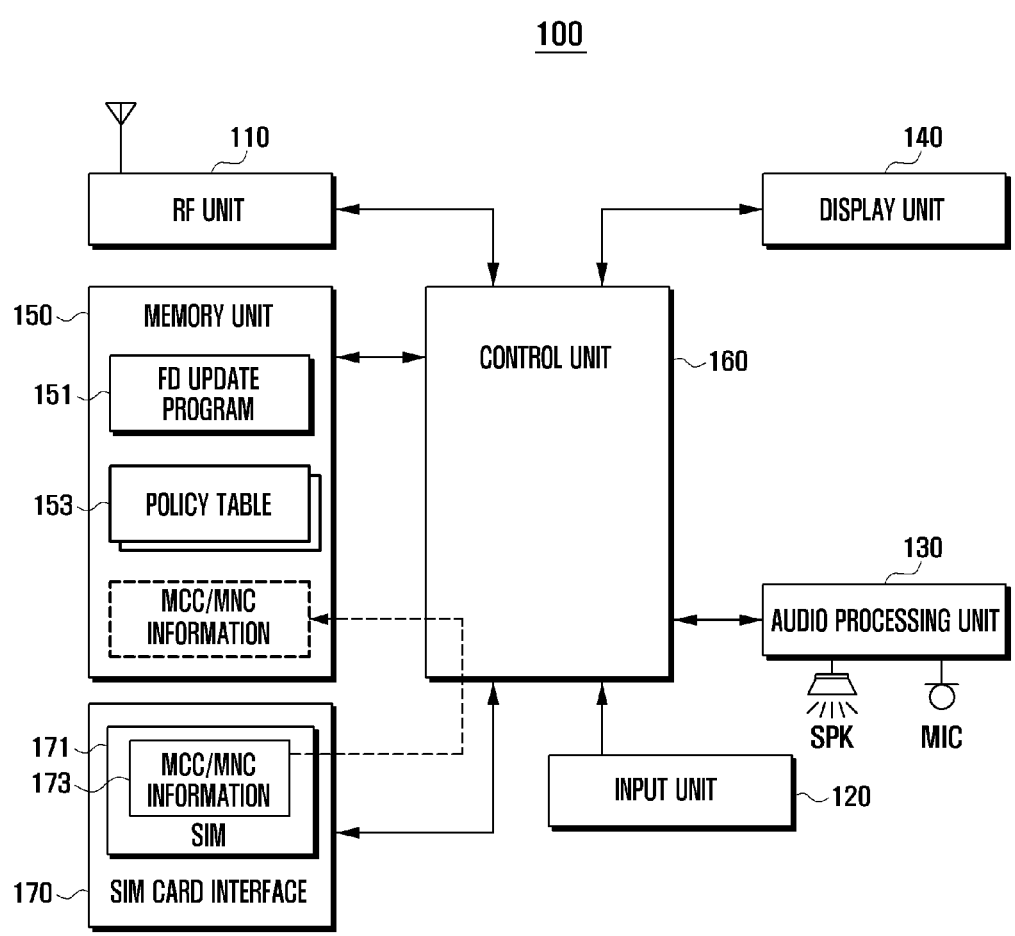
FIG. 2 is a block diagram illustrating the configuration of a portable device in accordance with an exemplary embodiment of the present invention.

FIG. 2 is a block diagram illustrating the configuration of a portable device in accordance with an exemplary embodiment of the present invention.

Referring to FIG. 2, the portable device 100 may include a Radio Frequency (RF) unit 110, an input unit 120, an audio processing unit 130, a display unit 140, a memory unit 150, a SIM card interface 170 into which a SIM 171 is inserted, and a control unit 160.

The portable device 100 having the above-specified elements may perform a camping-on to a specific service operator network supported by a particular SIM 171 by performing a PLMN selection including searching for a neighboring base station in a booting process after an insertion of the particular SIM 171 for using the specific service operator network or by performing the PLMN selection after a reinsertion of the SIM 171. Here, the portable device 100 may read MCC/MNC information 173 stored in the SIM 171 and determine data communication setting information corresponding to the MCC/MNC information 173. For this, the portable device 100 may acquire data communication setting information supported by each service operator network, store such information in the form of a policy table 153, and perform a related data communication setting, especially a fast dormancy setting, based on information stored in the policy table 153.

The RF unit 110 establishes a communication channel for a voice call, transmission of image data, formation of a communication channel for data transmission, etc. under the control of the control unit 160. Namely, the RF unit 110 establishes a voice call channel, a video call channel, a data communication channel, etc. with a service operator network in relation to the inserted SIM 171. For this, the RF unit 110 may include an RF transmitter that up-converts the frequency of an outgoing signal and amplifies the signal, an RF receiver that amplifies with low-noise an incoming signal and down-converts the frequency of the signal, and the like. More particularly, the RF unit 110 supports formation of a data communication channel with a specific service operator network selected depending on a data communication setting that corresponds to MCC/MNC information 173 stored in the SIM 171. Moreover, depending on a fast dormancy setting, the RF unit 110 determines RRC release timing of a data communication channel.

The input unit 120 includes a plurality of input keys and function keys to receive a user's input action and to set various functions. The function keys may have navigation keys, side keys, shortcut keys, and any other special keys defined to perform particular functions. Additionally, the input unit 120 receives a user's key manipulation for controlling the portable device 100, creates a corresponding input signal, and delivers it to the control unit 160. More particularly, depending on a user's manipulation, the input unit 120 may create an input signal for a booting process after the SIM 171 is inserted or reinserted, an input signal for instructing a communication through a specific service operator network based on the inserted SIM 171, or the like, and deliver it to the control unit 160.

The audio processing unit 130 includes a speaker (SPK) for outputting audio signals of currently playing content or audio signals received through a communication channel, and a microphone (MIC) for collecting a user's voice or other audio signals. More particularly, the audio processing unit 130 may output an alerting sound when the SIM 171 is inserted or reinserted and in a booting process after the SIM 171 is inserted. Additionally, when data communication setting information is updated according to the change of the SIM 171, the audio processing unit 130 may output a related alerting sound or voice guidance that explains a modification of a data communication setting. Moreover, when a fast dormancy setting is modified in an update process of data communication setting information, the audio processing unit 130 may output a related alerting sound or voice guidance under the control of the control unit 160. The above output of an alerting sound or voice guidance may be omitted or varied according to a user's setting or a device designer's intention.

The display unit 140 displays information, including various menus of the portable device 100, input by a user or offered to a user. Namely, the display unit 140 may visually offer a variety of screen views in connection with the use of the portable device 100, such as an idle screen, a menu screen, a message writing screen, a call screen, and the like. The display unit 140 may be formed of a Liquid Crystal Display (LCD), Organic Light Emitting Diodes (OLEDs), or any other equivalent. In case of being fabricated in the form of a touch screen, the display unit 140 may act as an input unit as well. More particularly, the display unit 140 may output a screen indicating whether the SIM 171 is inserted or not, and a screen related to a booting process after the SIM 171 is inserted. Also, when there is an update of data communication setting information corresponding to the MCC/MNC information 173 stored in the SIM 171 after the SIM-based booting process, the display unit 140 may output a related message, image or icon. This icon may be output in an indicator region normally used for displaying a battery level, etc. Moreover, when a fast dormancy setting is modified in the update process of data communication setting information, the display unit 140 may output a guidance message that explains a modification of a data communication setting under the control of the control unit 160. Additionally, when the SIM 171 is inserted, removed or reinserted, the display unit 140 may output a corresponding alert message.

The memory unit 150 stores applications required to execute functions of the portable device 100, such as applications required for supporting a call service, applications required for operating the SIM 171 connected to the SIM card interface 170, and the like. The memory unit 150 may consist of a program region and a data region.

The program region may store an Operating System (OS) for booting and operating the portable device 100, and applications required for performing various optional functions such as a sound output function, an image viewer function, or a video player function. The OS may determine, during a booting process of the portable device 100, whether the specific SIM 171 is inserted into the SIM card interface 170, and may perform a mobile communication service routine designed for supporting a mobile communication service based on the specific SIM 171. Also, the OS may control the transfer to a camping-on state by performing a PLMN selection process with a base station residing in a specific service operator network searched in the booting process. More particularly, the program region may store a Fast Dormancy (FD) update program 151 for controlling an update of data communication setting information according to the type of the SIM 171.

The FD update program 151 is loaded into the control unit 160 in a booting process and may contain a routine for extracting MCC/MNC information 173 from the inserted SIM 171, a routine for extracting data communication setting information corresponding to the extracted MCC/MNC information 171 from the policy table 153, and a routine for updating or maintaining current a fast dormancy setting according to the extracted data communication setting information. Also, the FD update program 151 supports an update of the policy table 153 stored in the data region. For this, the FD update program 151 may contain a routine for receiving the policy table 153 from an external entity, e.g., an update manager of the portable device, and a routine for comparing a version of the received policy table with a version of the stored policy table 153 and, if a new version is received, replacing the stored policy table 153 with the received policy table. This update of the policy table 153 may be carried out by a firmware upgrade, and hence in a background process under the control of the update manager.

The data region stores data created or received while the portable device 100 is used. For example, the data region stores recorded sound or video data, phonebook data, contents, or any other information. More particularly, the data region may store the policy table 153 discussed above. The policy table 153 records information about a fast dormancy policy of each service operator network. Namely, the policy table 153 contains the MCC/MNC information 173 for each SIM 171, and data communication setting information, e.g., fast dormancy setting information, supported by a service operator network having the MCC/MNC information 173. The MCC/MNC information 173 may be classified according to country or service operator network and may have substantially different information for each SIM 171. For instance, the MCC of Australia is 505, Austria is 232, Belgium is 206, Denmark is 238, and Finland is 244. Such MCC number is uniquely assigned to each country. MNC is a unique number assigned to each service operator network. For instance, MNC of Telecom Australia in Australia is 01, MNC of Optus Communication in the same country is 02, and MNC of Vodafone in the same country is 03. Similarly, MCC/MNC of Korean service operator KTF is 450/02, and MCC/MNC of SKT is 450/05. MNC of the same service operator network may be varied according to frequency band. For instance, 450/02 is MCC/MNC of KTF using CDMA 1700 MHz band, whereas 450/04 is MCC/MNC of KTF using CDMA 850 MHz band. Therefore, the MCC/MNC information 173 may have a specific number uniquely assigned to each SIM 171 provided by each service operator network, and each data communication setting, namely a fast dormancy setting, may be different according to such a number. The policy table 153 may record data communication setting information, especially fast dormancy setting information, for each MCC/MNC in the form of a table. Fast dormancy setting information may contain fast dormancy on/off information that indicates whether the SIM 171 having the MCC/MNC information 173 provides a fast dormancy, and any other parameter information such as RRC release timing information (e.g., a release at a lapse of two or five seconds after a specific signal is transmitted or received).

The SIM 171 may be embodied in the form of an Integrated Circuit (IC) card and may be inserted into various types of portable devices that support a mobile communication service. The SIM 171 has a region for storing subscriber data therein, so that the SIM 171 may use end-user functions provided by the portable device after being inserted into the portable device. Normally, the portable device 100 has the SIM card interface 170 for receiving the SIM 171. When the SIM 171 is inserted into the SIM card interface 170, the portable device 100 supplies power to the SIM 171. The SIM 171 performs an initialization process and communicates with the control unit 160 to send and receive data to and from the control unit 160. At this time, the portable device 100 may determine the MCC/MNC information 173 stored in the SIM 171 and store it in the memory unit 150. Also, the portable device 100 may extract data communication setting information corresponding to the MCC/MNC information 173, depending on both the MCC/MNC information 173 and the policy table 153, and adjust a fast dormancy policy setting of the portable device 100 using the extracted information.

The control unit 160 controls a power supplying and initializing process for each element of the portable device 100. After initializing, the control unit 160 may control each element of the portable device 100 to perform an update or maintenance of data communication setting information according to exemplary embodiments of this invention. For this, the control unit 160 may include configurations as shown in FIG. 3.

Figure 3:
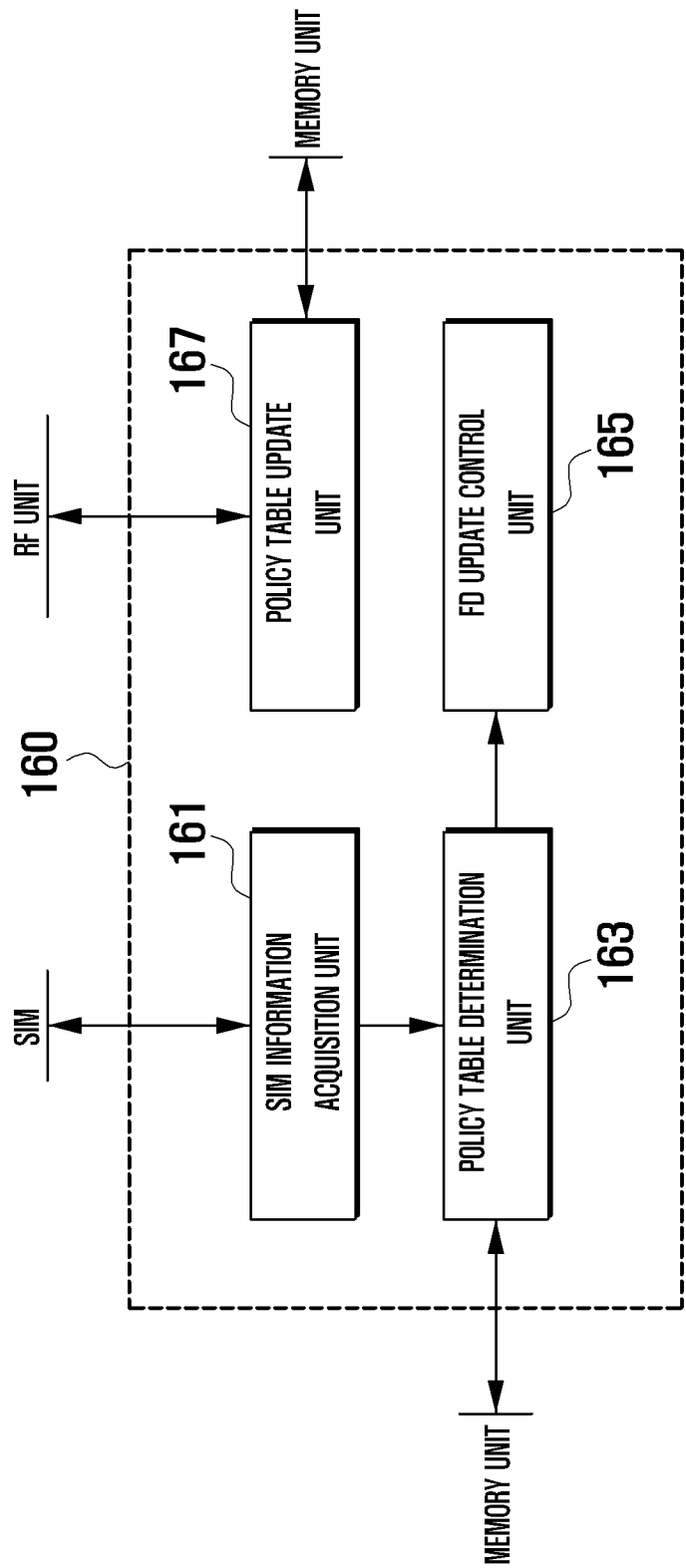
FIG. 3 is a block diagram illustrating a configuration of the control unit shown in FIG. 2 in accordance with an exemplary embodiment of the present invention.

FIG. 3 is a block diagram illustrating a configuration of the control unit shown in FIG. 2 in accordance with an exemplary embodiment of the present invention.

Referring to FIG. 3, the control unit 160 may include a SIM information acquisition unit 161, a policy table determination unit 163, an FD update control unit 165, and a policy table update unit 167.

The SIM information acquisition unit 161 is configured to extract the MCC/MNC information 173 from the SIM 171 when access to the SIM 171 is allowed in a booting process after the SIM 171 is inserted into the SIM card interface 170 of the portable device 100. After extracting the MCC/MNC information 173 from the SIM 171, the SIM information acquisition unit 161 may deliver the extracted MCC/MNC information 173 to the policy table determination unit 163. Also, the SIM information acquisition unit 161 may determine whether the inserted SIM 171 is equal to the previously inserted SIM, and deliver related information to the policy table determination unit 163.

The policy table determination unit 163 determines data communication setting information corresponding to the MCC/MNC information 173 received from the SIM information acquisition unit 161. For this, the policy table determination unit 163 may load the policy table 153 stored in the data region and determine, in the policy table 153, data communication setting information corresponding to the MCC/MNC information 173 received from the SIM information acquisition unit 161. Additionally, the policy table determination unit 163 may deliver the determined data communication setting information to the FD update control unit 165. Meanwhile, if informed from the SIM information acquisition unit 161 that the same SIM 171 is inserted, the policy table determination unit 163 may deliver no modification of data communication setting information to the FD update control unit 165.

The FD update control unit 165 may determine whether to update predetermined data communication setting information according to the type of information received from the policy table determination unit 163. More specifically, if receiving information about an insertion of the same SIM 171 from the policy table determination unit 163, the FD update control unit 165 may not perform an update process of the predetermined data communication setting information. Also, the FD update control unit 165 may perform a data communication setting control (e.g., applying of a fast dormancy policy) on the basis of the predetermined data communication setting information. If receiving new data communication setting information from the policy table determination unit 163, the FD update control unit 165 removes the predetermined data communication setting information and performs a data communication setting control based on the newly received data communication setting information.

The policy table update unit 167 is configured to control an update of the policy table 153 stored in the data region of the memory unit 150. The data communication setting information stored in the policy table 153 may be varied according to a policy change of each service operator that supports a mobile communication service. If a policy of a service operator is changed, a fast dormancy setting applied to the service operator network may be removed or parameter values of a fast dormancy setting may be modified. Therefore, a server that provides the policy table 153 may acquire information about a modification of a data communication setting for each service operator and create a new policy table based on the acquired information. Also, this server may create a blacklist that fails to support a fast dormancy, apply the blacklist to the new policy table, and send the new policy table to each portable device 100. The policy table update unit 167 may determine a version of the policy table received through the RF unit 110 and, if a new version is received, replace the stored policy table 153 with the received policy table.

As discussed hereinbefore, the portable device 100 for a data communication setting control according to an exemplary embodiment of this invention has the policy table 153 that contains data communication setting information, especially fast dormancy setting information or fast dormancy parameter setting information, classified according to each MCC/MNC information 173 stored in each SIM 171. When entering into a service operator network on the basis of an insertion of the specific SIM 171, the portable device 100 modifies information depending on a data communication setting supported by the service operator network. Therefore, the portable device of this invention may automatically update the data communication setting information depending on a change of the SIM 171 without requiring a user's input, and may also rapidly release RRC requiring high power consumption in a data communication process by supporting a fast dormancy function.

Now, an exemplary data communication setting control method will be described in more detail with reference to the drawings.

Figure 4:
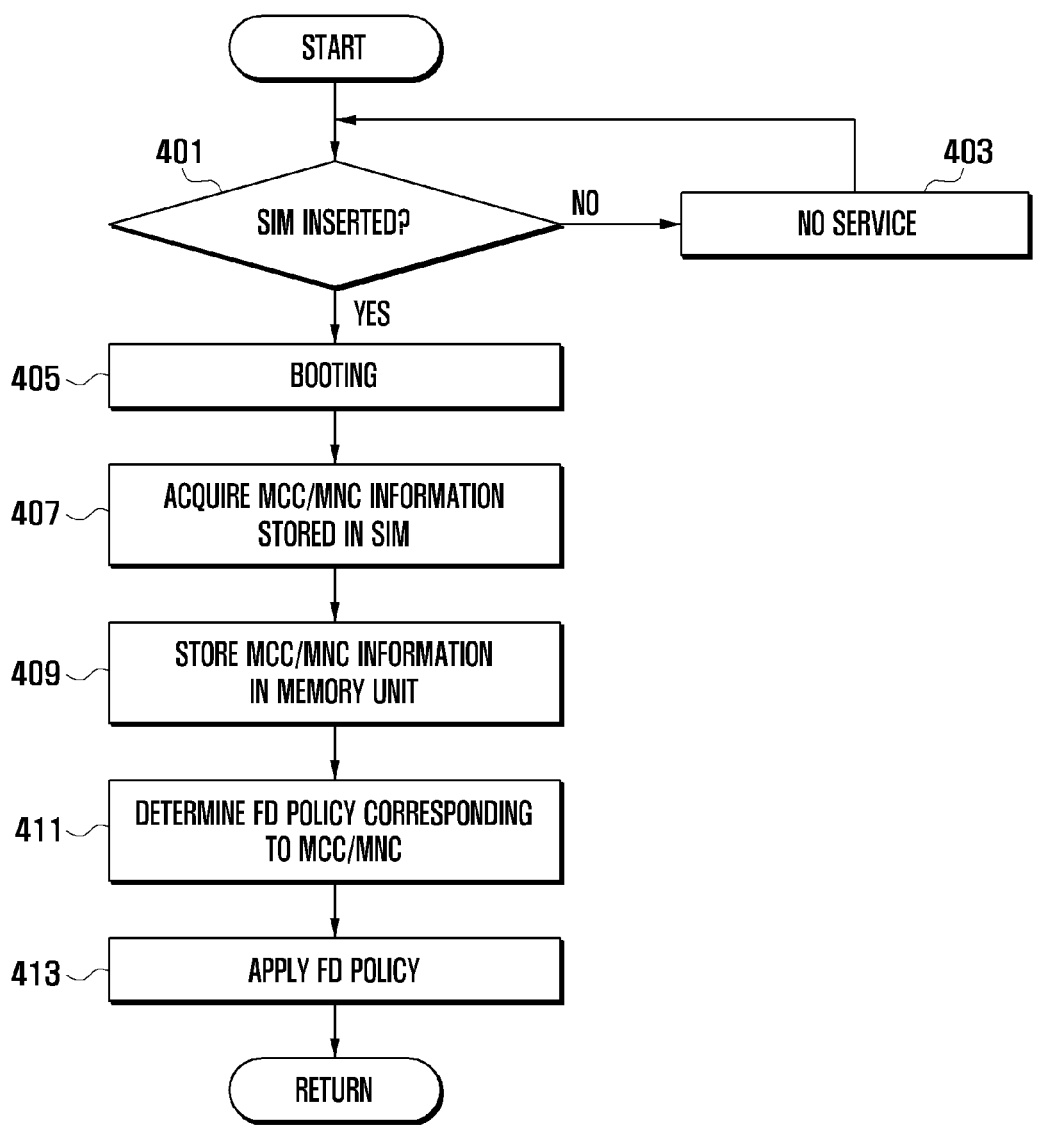
FIG. 4 is a flowchart illustrating a data communication setting control method in accordance with an exemplary embodiment of the present invention.

FIG. 4 is a flowchart illustrating a data communication setting control method in accordance with an exemplary embodiment of the present invention.

Referring to FIG. 4, the control unit 160 of the portable device 100 determines whether the SIM 171 is inserted into the SIM card interface 170 in step 401. If it is determined that the SIM 171 is not inserted, the control unit 160 may maintain a no service state in relation to a communication function in step 403. In this step, the control unit 160 may maintain the no service state for specific functions only related to a communication function such as a data communication or a voice communication, or may maintain the no service state for all services related to any other end-user functions such as a file play function, a file search function, or a file creation function. The no service state in relation to a communication function is caused since information required for substantially performing a communication function is stored in the SIM 171.

If it is determined in step 401 that the SIM 171 is inserted into the SIM card interface 170, if the power is supplied to the portable device 100, and if an input signal for a booting process is received, the control unit 160 may perform a predefined booting process based on the inserted SIM 171 in step 405. In this step, the control unit 160 may perform a search process for a base station residing in a subscribed service operator network and a camping-on process, depending on user information stored in the SIM 171.

Additionally, the control unit 160 may extract the MCC/MNC information 173 from the SIM 171 in step 407 and store the extracted MCC/MNC information 173 in the memory unit 150 in step 409. The storing step may be omitted according to a designer's intention. In this case, the control unit 160 may manage the data communication setting information only corresponding to the MCC/MNC information 173 of the inserted SIM 171 and, based on such information, perform a data communication setting control.

The control unit 160 may determine an FD policy corresponding to the MCC/MNC information 173 in step 411. Namely, the control unit 160 determines the data communication setting information corresponding to the MCC/MNC information 173 by referring to the policy table 153 containing the data communication setting information.

Thereafter, the control unit 160 may update a data communication setting by using the determined data communication setting information and, if there is an input signal for a data communication, perform the FD policy by referring to the data communication setting information in step 413. Namely, the control unit 160 may perform a setting such as the on/off and RRC release timing of fast dormancy supported by a service operator network related to the inserted SIM 171.

In the booting process after insertion of the SIM 171, the control unit 160 may determine whether the currently inserted SIM 171 is equal to any previously inserted SIM 171.

This determination process may be performed when the SIM 171 is inserted, reinserted, or replaced, or in the booting or rebooting process. The above-discussed steps 407 to 413 may be performed when the currently inserted SIM 171 is different from any previously inserted SIM 171.

If the currently inserted SIM 171 is equal to any previously inserted SIM 171, the control unit 160 may omit the above-discussed steps 407 to 411 and perform a data communication setting control on the basis of the data communication setting information previously stored in the memory unit 150. In order to compare information about the currently inserted SIM 171 with information about the previously inserted SIM 171, the control unit 160 may temporarily store information about the previously inserted SIM 171. Also, the control unit 160 may perform the above determination step and related step for updating or maintaining the data communication setting information when an input signal for an initial data communication function is received after the insertion of the SIM 171 and the completion of a booting process.

Additionally, if the policy table 153 is received from another portable device or device management server, the control unit 160 may determine a version of the existing policy table 153 stored in the memory unit 150 and a version of the received policy table. If the received policy table is a new one, the control unit 160 may update the stored policy table 153 in the memory unit 150 by using the received policy table.

Although the above-discussed method determines the MCC/MNC information 173 stored in the SIM 171 in the booting process and applies the data communication setting information, this is exemplary only and not to be considered as a limitation of the present invention. Alternatively, if there is an input signal for activating a specific end-user function related to a data communication while the portable device 100 operates, the control unit 160 may determine the MCC/MNC information 173 stored in the SIM 171, refer to the policy table 153, and apply the data communication setting information corresponding to the MCC/MNC information 173. In order to prevent repeated determinations for the data communication setting information, the above process may be performed when a data communication function is initially operated after the insertion of the SIM and booting process.

As discussed hereinbefore, the data communication setting control method according to an exemplary embodiment of this invention may support a data communication based on data communication setting information suitable for a particular service operator network to which a portable device is connected depending on both the SIM inserted into the SIM card interface and the policy table stored in the memory unit. More particularly, by establishing a fast dormancy setting for each service operator network on the basis of the SIM, this exemplary method may rapidly perform RRC release in any network supporting a fast dormancy and therefore may considerably reduce power consumption in a data communication process.

The above-discussed exemplary portable device may essentially or selectively include any other elements or components. For instance, the portable device may further include a short range communication module, a digital camera module, a wired or wireless data transmission interface, an Internet access module, a digital broadcast receiving module, and so forth. According to a digital convergence tendency today, such elements may be varied, modified and improved in various ways, and any other elements equivalent to the above elements may be additionally or alternatively equipped in the portable device. Meanwhile, as will be understood by those skilled in the art, some of the above-mentioned elements in the portable device may be omitted or replaced with another.

Additionally, an exemplary portable device of this invention may include any type of electronic devices that have SIM and support a data communication function using a base station. For instance, the portable device may include mobile communication devices, multimedia players and their application equipment, especially including many mobile communication terminals based on various communication protocols, a Portable Multimedia Player (PMP), a digital broadcasting player, a Personal Digital Assistant (PDA), a music player (e.g., an MP3 player), a portable game console, a smart phone, a notebook, a handheld personal computer, etc.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:
1. A data communication setting control method based on a Subscriber Identification Module (SIM) inserted into a portable device, the method comprising:
  extracting Mobile Country Code/Mobile Network Code (MCC/MNC) information from the inserted SIM;
  determining fast dormancy setting information corresponding to the MCC/MNC information from a first policy table comprising a mapping relation between the MCC/MNC information of each service operator network and information about fast dormancy on/off and Radio Resource Control (RRC) release timing of each service operator network; and
  setting the fast dormancy on/off and the RRC release timing of the specific service operator network, based on both the determined fast dormancy setting information and the SIM.

2. The method of claim 1, wherein the extracting of the MCC/MNC information, the determining of the fast dormancy setting information, and the setting of the fast dormancy are performed in response to at least one of an insertion of the SIM, a reinsertion of the SIM, a replacement of the SIM, a booting process of the device based on the SIM, a rebooting process of the device based on the SIM, and an input signal for performing an initial data communication function after the insertion of the SIM and the completion of the booting process.

3. The method of claim 1, further comprising:
  storing the first policy table in the memory unit.

4. The method of claim 1, further comprising:
  receiving a new policy table containing the fast dormancy setting information for each MCC/MNC information from a server;
  determining a version of the received new policy table; and
  if the version of the received policy table is different from a version of the first policy table, updating the first policy table with the received new policy table.

5. A data communication setting control method based on a Subscriber Identification Module (SIM) inserted into a portable device, the method comprising:
  determining whether a currently inserted SIM is equal to a previously inserted SIM;
  if the currently inserted SIM is not equal to the previously inserted SIM extracting Mobile Country Code/Mobile Network Code (MCC/MNC) information from the inserted SIM;

determining fast dormancy setting information corresponding to the MCC/MNC information from a first policy table comprising a mapping relation between the MCC/MNC information of each service operator network and information about fast dormancy on/off and Radio Resource Control (RRC) release timing of each service operator network; and setting the fast dormancy on/off and the RRC release timing of the specific service operator network, based on both the determined fast dormancy setting information and the SIM; and if the currently inserted SIM is equal to the previously inserted SIM, omitting the extracting of the MCC/MNC information, the checking the fast dormancy setting information, and the setting of the fast dormancy, and maintaining a fast dormancy setting established on the basis of the previously inserted SIM.

6. The method of claim 5, wherein the determining of whether the currently inserted SIM is equal to a previously inserted SIM is performed in response to at least one of an insertion of the SIM, a reinsertion of the SIM, a replacement of the SIM, a booting process of the portable device based on the SIM, a rebooting process of the portable device based on the SIM, and an input signal for performing an initial data communication function after the insertion of the SIM and the completion of the booting process.

7. A portable device for supporting a data communication setting control based on a Subscriber Identification Module (SIM), the device comprising:

a SIM card interface into which the SIM is inserted;

a control unit for extracting Mobile Country Code/Mobile Network Code (MCC/MNC) information from the inserted SIM, for determining fast dormancy setting information corresponding to the MCC/MNC information from a policy table comprising a mapping relation between the MCC/MNC information of each service operator network and information about fast dormancy on/off and Radio Resource Control (RRC) release timing of each service operator network, and for setting fast dormancy by using the determined fast dormancy setting information;

a memory unit for storing the policy table; and a Radio Frequency (RF) unit for performing the setting of the fast dormancy with a specific service operator network related to the SIM under the control of the control unit.

8. The device of claim 7, wherein the control unit determines whether a currently inserted SIM is equal to a previously inserted SIM in response to at least one of an insertion of the SIM, a reinsertion of the SIM, a replacement of the SIM, a booting process of the device based on the SIM, a rebooting process of the device based on the SIM, and an input signal for performing an initial data communication function after the insertion of the SIM and the completion of the booting process.

9. The device of claim 8, wherein the control unit is further configured, if the currently inserted SIM is equal to the previously inserted SIM, to maintain a fast dormancy setting established on the basis of the previously inserted SIM.

10. The device of claim 9, wherein the control unit, if the currently inserted SIM is not equal to the previously inserted SIM, sets the fast dormancy setting on the basis of the currently inserted SIM.

11. The device of claim 7, wherein the control unit includes a fast dormancy update control unit for updating a setting about the fast dormancy on/off and the RRC release timing of the specific service operator network.

12. The device of claim 7, wherein the control unit includes a policy table update unit for receiving a new policy table containing the fast dormancy setting information for each MCC/MNC information, for determining a version of the received policy table, and, if the version of the received policy table is a new one, for updating the policy table previously stored by using the received policy table.

13. The device of claim 7, wherein the control unit includes a SIM information acquisition unit for extracting the MCC/MNC information from the SIM.

* * * * *